July 30, 1935. C. BOUILLON 2,009,726
CHANGE GEAR ATTACHMENT FOR MACHINES
Filed July 23, 1931 3 Sheets-Sheet 2

Inventor.
Constant Bouillon.
By Ernest R. Llewellyn.
Attorney.

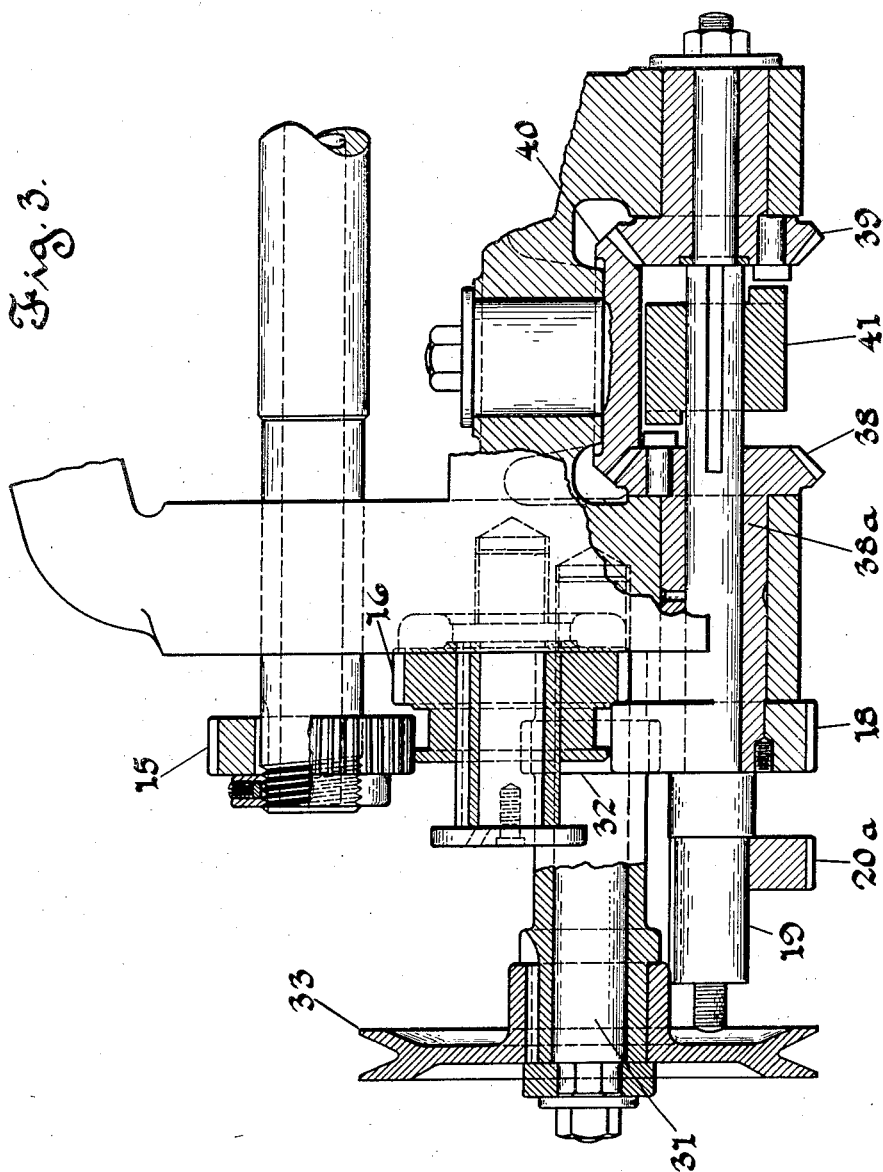

Patented July 30, 1935

2,009,726

UNITED STATES PATENT OFFICE 2,009,726

CHANGE GEAR ATTACHMENT FOR MACHINES

Constant Bouillon, Torrington, Conn., assignor to The Hendey Machine Company, Torrington, Conn., a corporation of Connecticut Application July 23, 1931, Serial No. 552,669

3 Claims. (Cl. 82—26)

This invention relates to lathes and machines of like character and more particularly to feed mechanisms for moving the carriage and tool support in direct relation to the speed of the work spindle of the machine.

In the conventional design of lathes it is the common practice to provide change-gear mechanism actuated directly from the spindle to give a direct ratio of longitudinal feed between the carriage that supports the cutting tool, and the head-stock spindle that revolves the work to be operated upon. This direct ratio is an important factor where the lathe is utilized in a thread cutting operation and the threads cut a desired lead and within certain limits.

To accomplish this result the lathe is provided with a head-stock having the usual spindle rotatably mounted therein. Various combinations of change gears are used in effecting a desired basic ratio of drive from the spindle to the quick change-gear box that directly or indirectly rotates the lead screw and which is effective in longitudinally moving the carriage and apron along the bed at the desired rate of speed, according to the combination of gears selected, to produce the desired longitudinal feed of the tool relative to the work. Speeds and feeds utilized in the operation of thread cutting are of a relatively low ratio with the cutting tool point of desired shape to properly form the side angles and root of the thread.

In the arrangement of the above change-gear mechanism it is general practice to provide the head-stock spindle with a driving pinion which may be engaged or disengaged by an intermediate sliding gear which operates the interchangeable gears cooperating with the compound gear box. This compound gear box comprises a cone of varying ratio quick change gearing which operates the main quick change gear box containing a cone of selective gears which operate the lead screw. With this arrangement of gearing various combinations may be quickly selected to effect a given ratio of speed between the spindle and lead screw which actuates the carriage.

It is often desirable to use the above-mentioned thread cutting lathe in turning operations which presents attendant difficulties as it has been found more practical in turning operations to use an exceedingly greater spindle speed to revolve the work than is desirable or practical in thread cutting operations. While the thread cutting operation requires that a direct ratio be maintained between the spindle and longitudinal feed, turning operations, to produce a desired finish are usually accomplished with an exceedingly slow feed and high spindle speed and this ratio of feed is impractical to obtain through the regular arrangement of gearing from the desired high rate of spindle speed as this would require too great a reduction through the interchangeable gears which are required for thread cutting operations.

Accordingly, the object of my present invention is to provide an auxiliary feed mechanism so organized and adapted that it may be interpositioned with the regular gearing for conversion from the regular ratio of speeds and feeds of a thread cutting lathe to the most desirable ratio of speeds and feeds for turning operations.

Another object of my invention is the organization of parts in a unit adaptable to be conveniently attached to the present design of engine lathe now in use and equipped for thread cutting operations and whereby the lathe may be converted into a high speed turning lathe.

With the above and other objects in view my invention consists in a novel combination and arrangement of parts hereinafter described and more specifically pointed out in the appended claims.

In the accompanying drawings I have shown a preferred and modified form of my invention sufficient to enable those skilled in the art to understand the construction and operation thereof.

Referring to the drawings:—

Fig. 3 is substantially a vertical section, a portion of the gear train with reverse gearing.

Figure 1:
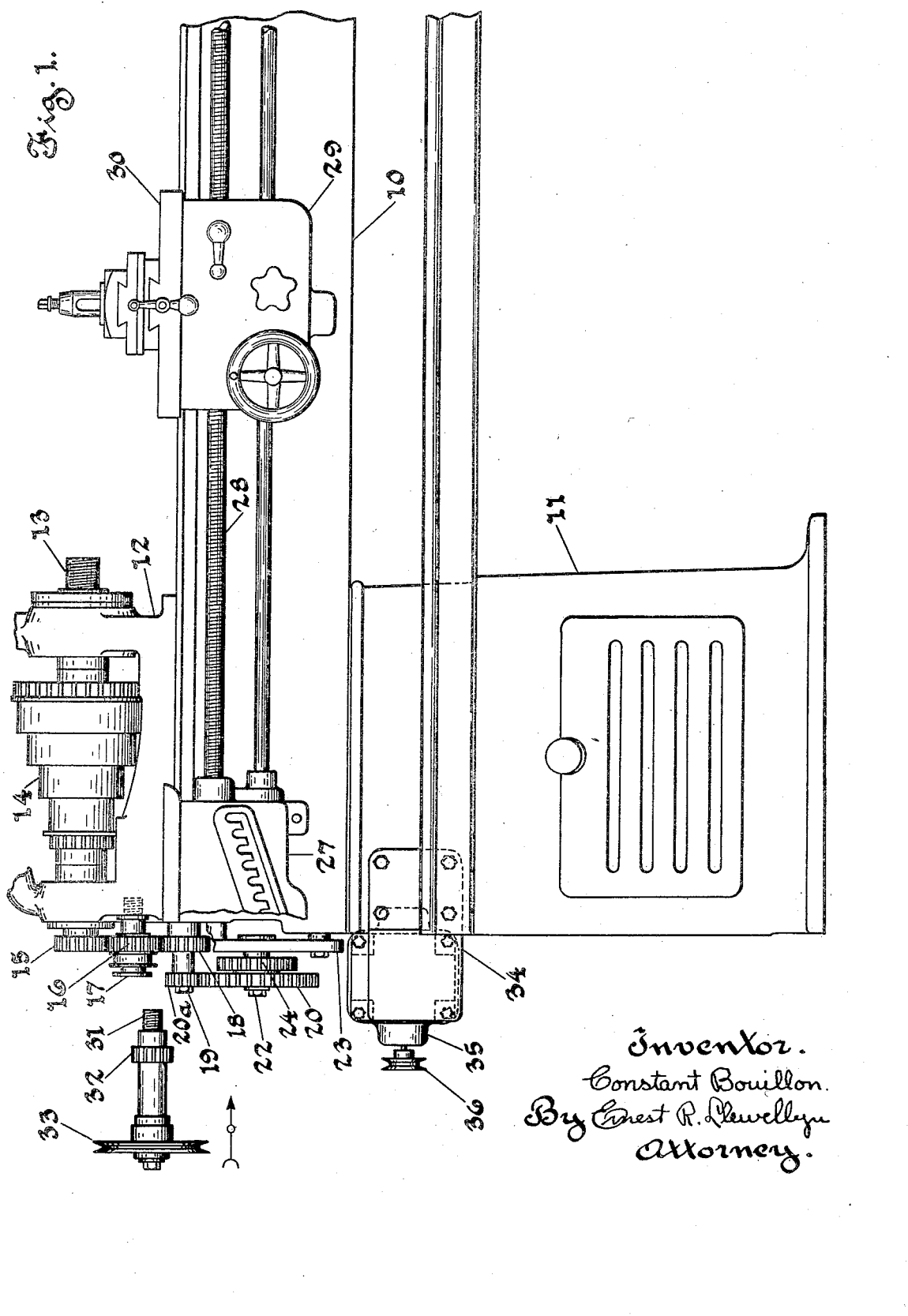
Fig. 1 is a partial front elevation of a lathe having my attachment associated therewith, a portion of the attachment being shown detached.

Referring to the drawings 10 is a portion of a lathe bed mounted on the usual pedestals 11. Secured to the lathe bed 10 is the headstock 12 which has rotatably mounted therein the work spindle 13. In this instance a cone pulley 14 is shown mounted on the spindle, said pulley being driven by any suitable means, not shown.

Figure 2:
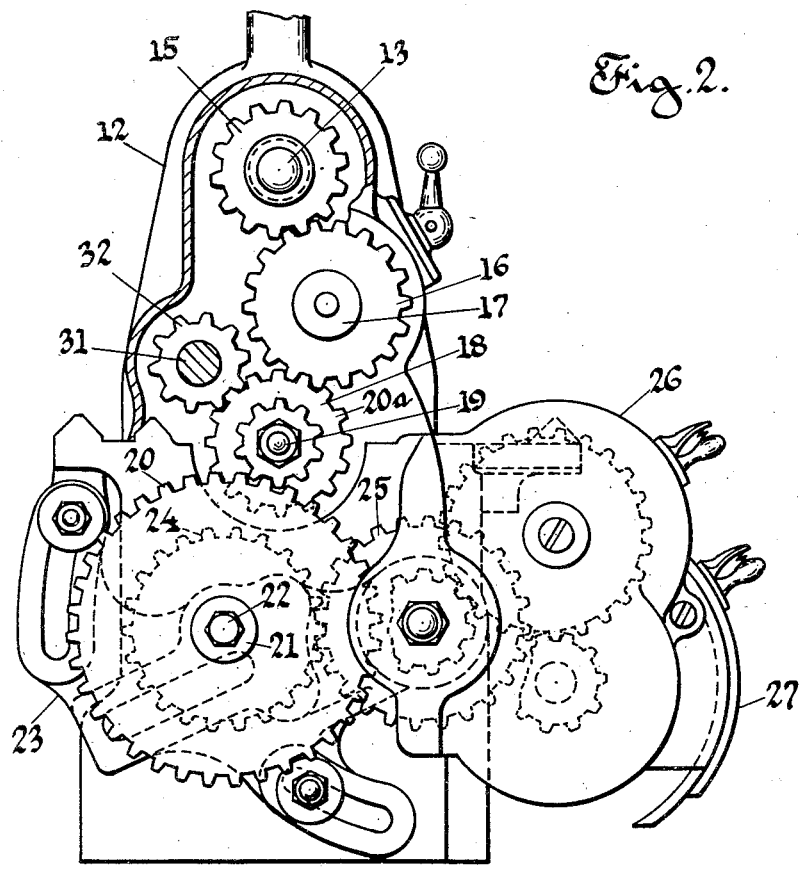
Fig. 2 is an end elevation of the gear train, on an enlarged scale, viewing in direction of arrow *a*, Fig. 1.

Secured on the outer end of the spindle 13 is a driving pinion 15 which is engaged by a gear 16 slidably mounted on a stud 17 secured in the headstock 12. At Fig. 1 the gear 16 is shown in its engaged position with the driving pinion 15 and the gear 18 which rotates the feed shaft 19 mounted in suitable bearings in the headstock 12, see Figs. 1, 2, and 3.

Secured on the outer end of the feed shaft 19 and driven thereby is a pinion 20a meshing with and driving the sector gear 20 secured to the bushing 21 which is rotatably mounted on the stud 22 secured in the sector 23, said sector being of the usual construction and adapted to receive gears interchangeable with gear 20 to give a desired change in the ratio of the gear train. Secured on the bushing 21, with the gear 20, is a gear 24 which meshes with and drives the gear 25 associated with and driving the change gears of the compound gear box 26 and quick change gear box 27, the operation of which is well known in the art and set forth in Patent No. 519,924 issued to W. P. Norton, May 15, 1894.

Actuated through the quick change gear box 27 is the lead screw 28 which engages with and traverses the apron 29 and carriage 30 which has mounted thereon the usual tool support.

The above elements and the operation thereof are conventional in engine and thread cutting lathes and well known in the art therefore further detailed description is unnecessary.

As above mentioned the longitudinally slidable gear 16 may be disengaged from the pinion 15 as illustrated at Fig. 3, and this permits the spindle 13 being rotated at a desired speed with the feed gearing inoperative. To produce an optional low feed speed I have provided a detachable unit which comprises a shaft 31, shown detached at Fig. 1, which is threaded at its inner end for positioned engagement with a threaded bore provided in the headstock, see Fig. 2. The shaft 31 has rotatably mounted thereon a driving pinion 32 formed, in this instance, integral with a driven pulley 33. It is obvious that the pinion 32 and driven pulley 33 construction may be modified in various ways such as a sliding pinion, as above described or by utilizing the well known clutch unit. When in its engaging position, see Fig. 2, the driving pinion 32 meshes with and drives the gear 18 of the gear train which through the regular quick change gears rotates the lead screw to produce the desired carriage feed. I have provided a bracket 34 which is suitably secured to the lathe, said bracket supporting a motor 35 with a driving pulley 36 which is connected by suitable means, not shown, with the pulley 33. With this attachment I am permitted to select a motor of desired speed and with proper driving and driven pulley produce a range of feed speeds best adapted to turning operations.

In common practice a lathe of the above referred to type is provided with twelve changes of feed in the quick change gear box and through the compound gear box thirty-six changes are obtained.

Without sacrificing any of the advantages of the above feeds for thread cutting and the like, with my attachment thirty-six additional proportionate feeds are obtained.

Figure 4:
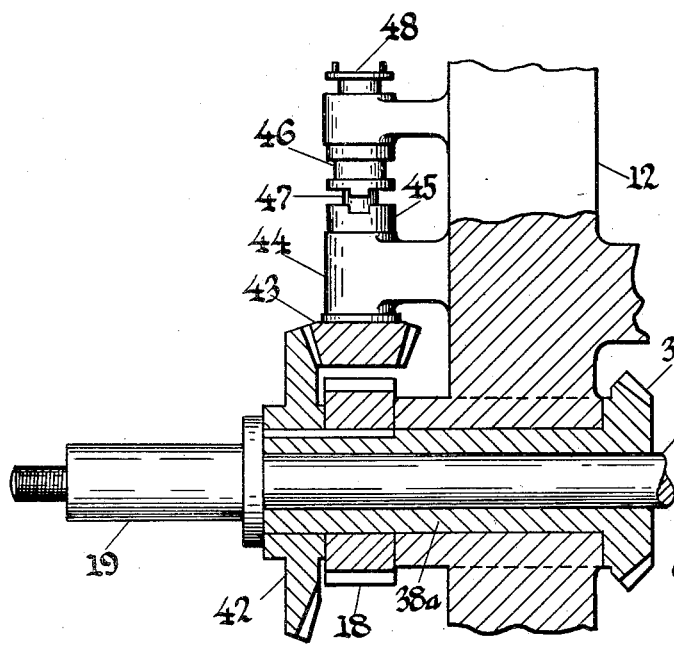
Fig. 4 is a sectional view showing a modification of the driving pinion and engaging arrangement.

At Fig. 4, I have shown a modification of the attachment drive gearing associated with the usual reversing gears which comprise bevel pinions 38, 39 freely mounted on the feed shaft 19, said pinions being meshed with bevel pinion 40 rotatably mounted in a suitable bearing in the headstock. The clutch 41 is slidably keyed on the shaft 19 and adapted to be engaged with the bevel pinions 38 or 39 to produce the desired direction of rotation to the feed gearing as set forth in the patent to Norton above referred to. The bevel pinion 38 is provided with an extending hub 38a which has secured thereto the driving gear 18 also a bevel gear 42 which meshes with and is driven by the bevel pinion 43 rotatably mounted in a suitable bearing 44. The pinion 43 has secured thereto a clutch face 45 adapted to be engaged by the clutch 46 slidably secured to the drive shaft 47. The shaft 47 is provided with a coupling 48 by which it may be secured to, and driven by, any suitable means.

With this arrangement of parts the gears are in mesh at all times, the auxiliary driving means being engaged through the manipulation of the clutch. With this construction it is manually possible to disengage the sliding gear 16 and engage the clutch 46 to accomplish the results as above mentioned. It is advisable to synchronize the engagement of the two elements to prevent the possible engagement of the two elements which is subject matter to be described in a separate application.

Having thus described my invention it will be evident that many changes and modifications may be made therein by those skilled in the art without departing from the spirit and scope thereof therefore, I do not wish to be limited to the specific details herein disclosed, and while I have shown my attachment associated with a particular type of machine it is to be understood that it is for illustrative purpose only as the device may be applied in various ways to different types of machines, but what I claim is:—

1. In a lathe having a spindle and a work support, a driving member for the spindle; a main drive gear train connecting the spindle and support, for driving the latter at a speed in direct ratio to the speed of the former, said train including means also for driving the support from an auxiliary source of power, while the main drive is disconnected; an auxiliary drive for the support, and means rendering said auxiliary drive operable simultaneously with the spindle at an indirect ratio to the spindle speed.

2. In a lathe having a spindle and a work support, a driving member for the spindle; a main drive gear train connecting the spindle and support, for driving the latter at a speed in direct ratio to the speed of the former, said train including means also for driving the support from an auxiliary source of power, while the main drive is disconnected; an auxiliary drive for the support, and means comprising a gear in said main drive slidable on its shaft to remove it from said drive for said support to render said auxiliary drive operable simultaneously with the spindle at an indirect ratio to the spindle speed.

3. In a lathe having a spindle and a work support, a driving member for the spindle; a main drive gear train connecting the spindle and support, for driving the latter at a speed in direct ratio to the speed of the former, said train including means also for driving the support from an auxiliary source of power while the main drive is disconnected; an auxiliary drive for the support, and means comprising a gear in said drive slidable on its shaft to remove it from said main drive for said support, and an auxiliary gear connecting said train and auxiliary drive adapted to be operably positioned therebetween to render said auxiliary drive operable simultaneously with the spindle at an indirect ratio to the spindle speed.

CONSTANT BOUILLON.